United States Patent [19]
Wetherington, Jr. et al.

[11] 3,922,876
[45] Dec. 2, 1975

[54] ENERGY CONSERVATION UNIT

[75] Inventors: Thomas I. Wetherington, Jr., St. Petersburg; McKay Goode, Longwood; Colin D. Burgess, Maitland, all of Fla.

[73] Assignee: Energy Conservation Unlimited, Inc. Longwood, Fla.

[22] Filed: Nov. 21, 1974

[21] Appl. No.: 525,962

[52] U.S. Cl. .................. 62/180; 62/177; 62/183; 62/185; 62/201; 62/238; 62/203; 62/510
[51] Int. Cl.² .......................... F25D 17/00
[58] Field of Search ....... 62/238, 79, 180, 179, 183, 62/185, 201, 99

[56] References Cited
UNITED STATES PATENTS

| | | | |
|---|---|---|---|
| 1,935,281 | 11/1933 | Reed | 62/238 |
| 2,042,812 | 6/1936 | Tull | 62/238 |
| 2,241,070 | 5/1941 | McLenegan | 62/180 |
| 2,700,279 | 1/1955 | Stickel | 62/238 |
| 3,188,829 | 6/1965 | Siewert | 62/238 |
| 3,301,002 | 1/1967 | McGrath | 62/201 |
| 3,513,663 | 5/1970 | Martin | 62/238 |

Primary Examiner—William J. Wye
Attorney, Agent, or Firm—Duckworth, Hobby & Allen

[57] ABSTRACT

Disclosed is an energy conservation system for utilizing the waste heat from an air conditioner or refrigeration system to heat water. The system includes a heat exchanger coupled in the output of the compressor of the air conditioner or refrigeration system and to a water reservoir for effecting heat transfer. A pump is interposed between the water reservoir and the heat exchanger for circulating the water. A temperature sensor thermally coupled to the water and electrically coupled to the pump is provided for rendering the pump inoperative when the temperature of the water in the reservoir is at or above a preselected temperature. A temperature operated valve is interposed between the heat exchanger and the reservoir, such that only water heated to a predetermined temperature is delivered to the reservoir.

12 Claims, 6 Drawing Figures

ENERGY CONSERVATION UNIT

BACKGROUND OF THE INVENTION

1. Field of the Invention

The present invention relates to energy conservation systems and apparatus, and in particular relates to such systems which utilize the waste heat in air conditioning and refrigeration systems for purposes of heating water.

2. Description of the Prior Art

There have been teachings in the prior art for various combinations of refrigeration apparatus and a water heater, in which water is heated by being thermally coupled with the hot gases exiting the compressor of a refrigeration system. As is well known, the refrigerant of such refrigeration equipment when compressed, reaches temperatures on the order of 200°F. and thus provides a useful heat source for water for commercial and residential purposes. Examples of such systems are shown in the following U.S. Pat. Nos.: 2,562,651 to Whitney; 1,331,600 to Wales; 1,786,861 to Miller et al; 1,922,132 to Holmes; and 2,125,842 to Eggleston.

Such systems have several basic disadvantages. First, the flow of water through the heat exchanger is generally continuous, and if the refrigeration equipment operates for a substantial period of time, the temperature of the water may exceed safety limits in the water reservoir (such as a commercially available hot water tank), and thus effect the opening of a safety valve of the type required in residential hot water tanks. A second disadvantage arises when relatively cold water is fed back into the water heater, due to low start-up, or ambient temperatures. Although the refrigerant temperature for commercially available refrigeration cycles (such as a central air conditioner for a single family dwelling) is usually around 200°F. as the refrigerant leaves the compressor, the start up period in the heat exchanger may result in initial water temperatures below the temperature of the water in the storage facility.

Further, many building codes require that water for human consumption be adequately protected from any potential contaminates, which includes the freon refrigerants normally used in commercial air conditioning and refrigeration equipment. Additionally, energy transfer systems of the type described are usually located in close proximity to the compressor unit, which may be located in an outside environment. Accordingly, it is desirable to provide means for preventing the complete release of all of the water in the system, and especially the hot water in the event that a portion of the water in the line freezes as a result of lower outside temperatures.

SUMMARY OF THE INVENTION

The present invention contemplates an energy transfer system for use with cooling means and a water reservoir; the cooling means being of the type having a compressor and a condenser, and a compressible fluid flowing through an input into the condenser from the compressor. The energy transfer system comprises a heat exchange means coupled to the input to the condenser and to the water reservoir for receiving water from the reservoir and transferring heat from the compressible fluid to the water. A pump is provided, and is interposed between the reservoir and the heat exchange means for pumping water therebetween. A temperature sensing means is thermally coupled to the water passing through the pump and electrically coupled to the pump for rendering the pump inoperative when the temperature of the water is at, or above a preselected temperature.

In a preferred embodiment, a return water line is coupled between the heat exchange means and the water reservoir, and a temperature sensing valve is interposed in the return line, suitably in close proximity to the heat exchange means, for preventing water from exiting the heat exchange means until the water is at, or above a predetermined temperature. In this preferred embodiment, means are provided for energizing the pump only during operation of the compressor.

THE DRAWINGS

DESCRIPTION OF THE PREFERRED EMBODIMENT

A first embodiment of the present invention will be described with reference to FIG. 1.

Figure 2A:
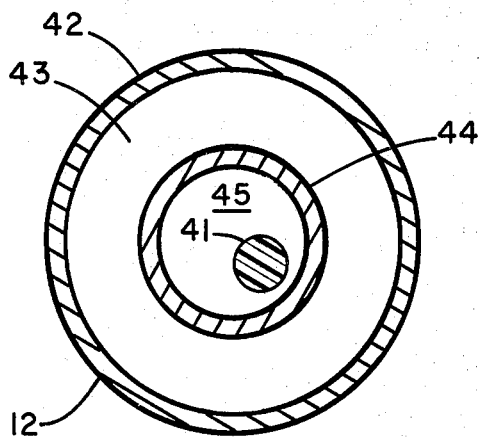
FIG. 2 is a cross-section of a portion of the apparatus shown in FIG. 1.
Figure 2B:
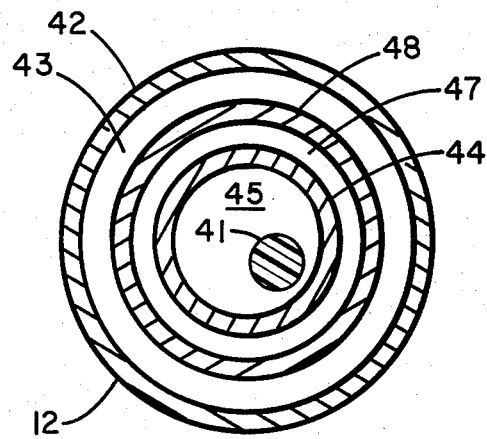

An energy transfer system in accordance with the present invention includes a water reservoir facility 10, such as a residential water heater, and a heat exchanger 12. A variety of commercially available heat exchangers are available; for example, a suitable heat exchanger is manufactured by Edwards Engineering Corporation, of Pompton Plains, New Jersey and is identified by the model No. H-3/4(mod.). Alternative embodiments of the heat exchanger 12 are shown in FIGS. 2(a) and 2(b), and is described in greater detail below with reference thereto.

An entry water line 14 and a return water line 16 are respectively provided between the hot water reservoir 10 and the heat exchanger 12, for allowing water to first flow into the heat exchanger and thereafter to return to the water reservoir. A pump 18 is interposed in the entry line 14 between the water reservoir 10 and the heat exchanger 12, and is adapted to circulate water from the water reservoir 10 through the entry line 14, through the pump, through the heat exchanger 12, through the return line 16 and back into the water reservoir 10.

A thermally operated valve 22 is interposed in the return line 16 between the heat exchanger 12 and the water reservoir 10, and is preferably positioned next adjacent the heat exchanger 12 in a portion of the return line 16 which is elevated with respect to the entry line 14, and suitably, the heat exchanger 12. A commercially available valve suitable for this purpose is manufactured by Watts Regulator Company, of Lawrence, Massachusetts, and is identified as 70AZ1.

A thermally operated switch 20 is positioned in the entry line 14 between the pump 18 and the reservoir 10, and is electrically coupled with the pump to render it inoperative under certain conditions, as is described below in greater detail. Suitable thermally operated switches are commercially available; for example the KLIXON, manufactured by Texas Instruments, Inc., of Versaille, Kentuck.

As noted above, the energy transfer system of the present invention is adapted for use with any refrigeration system of the type employing a condenser 24 having hot gas discharge input line 26 associated therewith for directing a compressed refrigerant from a compressor 28.

In accordance with the present invention, the input line 26 is coupled through the heat exchanger 12 such that hot gas flow is in a reverse direction with respect to the flow of water therein (note flow arrows in heat exchanger 12). The compressor 24 is provided with a line voltage input 30, which typically comprises 220 volts A.C. The pump 18 is coupled across the line voltage input 30 via circuit lines 32, 34. In order to render the pump inoperative dependent upon the switch 20, the switch is interposed in series between the pump and the line voltage input 30.

Operation of the system of FIG. 1 will now be described. Initially, it is assumed that the compressor 28 is not operating, and thus no refrigerant is flowing through the input 26 into the condenser 24. Likewise, the pump 18 is inoperative, and thus no water flows through the heat exchanger 12. Under these quiescent conditions, the temperature of the water in the lines 14 and 16, and the heat exchanger 12 will normally fall below acceptable temperature levels for re-entry into the hot water reservoir 10.

When a demand is made to the air conditioning or refrigeration system, including the condenser 24 and the compressor 28, the compressor is energized causing superheated, compressed refrigerant to flow through the input 26. Application of the line voltage input 30 to the compressor 28 likewise energizes the pump 18 (assuming that the temperature switch 20 is closed, as will be described more fully below). However, until such time as the superheated refrigerant has transferred sufficient energy to the water to raise the water temperature in the first portion of the return line 16 passing through the temperature valve 22 to a predetermined temperature, e.g. on the order of 140° to 150° for residential hot water systems, the valve 22 remains closed and no water flows. When the temperature of the water is raised to the desired predetermined level of the valve 22, however, that valve is opened allowing the pump 18 to push the hot water out of the heat exchanger 12, through the temperature valve 22, along the return line 16 and into the hot water reservoir 10. Water flow will thus continue until such time as the pump is turned off in conjunction with the turning off of the compressor 28, or opening of the switch 20, which will now be described.

The switch 20 is interposed at the front of the entry line 14 before it enters the heat exchanger 12, and thus senses the temperature of the water flowing out of the reservoir 10. If the compressor 28 has been operating for a long period of time, the heated water out of the heat exchanger 12 may be at a sufficient temperature and in sufficient volume to trigger temperature relief valves in the reservoir 10, such as those that are included in present day commercial and residential hot water heaters. Accordingly, the switch 20 is set at a level above the desired hot water temperature but below the normal temperature relief valve settings, e.g., between 180°F. and 200°F., and renders the pump 18 inoperative when the switch 20 is opened upon sensing hot water returning into the heat exchanger through the entry line 14 which has a temperature at, or above this preselected temperature. In this way, the switch 20 prevents excessive temperatures from triggering any temperature relief valve associated with the water reservoir 10.

Figure 1:
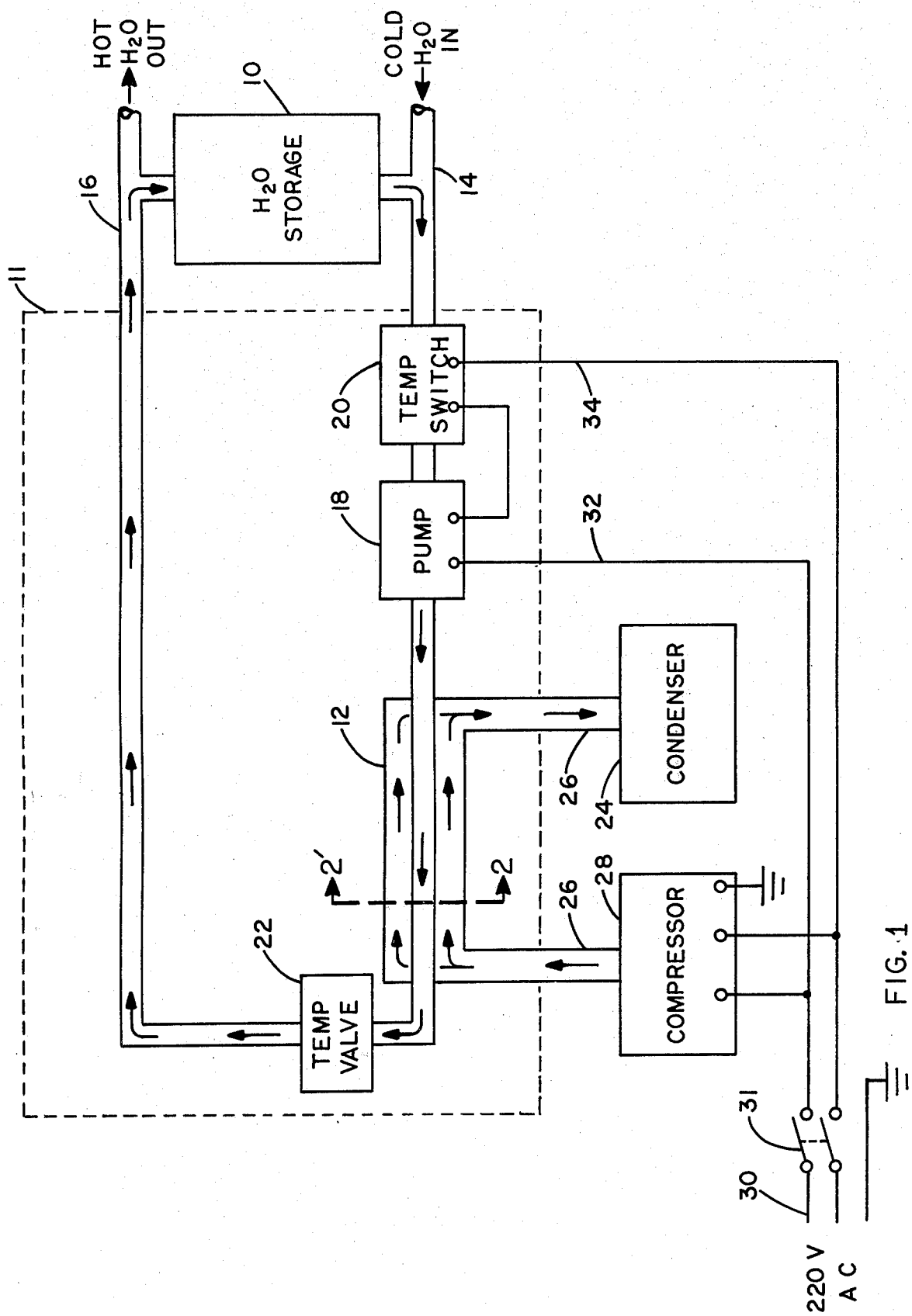
FIG. 1 is one embodiment, partially in cross-section and partially in flow chart-block diagram form, of one embodiment in accordance with the present invention.

As shown enclosed by dotted lines in FIG. 1, the heat exchanger 12, pump 18, temperature switch 20 and temperature valve 22 define an energy conservation unit 11 which comprises a subcombination of the total system just described. This subcombination of components may be utilized with existing air conditioning or refrigeration equipment and co-located water heaters and/or hot water reservoirs. Thus, the energy conservation unit 11 may be manufactured and installed as a component sub-system in conjunction with presently existing air conditioning, heat pump, refrigeration systems and water heating systems.

Alternative embodiments of the heat exchanger 12 will now be specifically described with references to FIGS. 2(a) and (b), which illustrate cross-sections of the heat exchanger 12 of FIG. 1 taken along the lines 2—2'.

Noting FIG. 2(a), the heat exchanger 12 includes an enclosed outer wall 42 and a first inner wall 44 enclosed within the outer wall and defining a first passageway 43 therebetween. A second passageway 45 is defined inside the inner wall 44. A collapsible member 41 is inserted in the passageway 45.

In the embodiment of FIG. 2(b), a second inner wall 48 is provided, defining a third passageway 47 between the first and second passageways 43 and 45, respectively. The third passageway 47 may be filled with a material having good heat transfer characteristics, or alternatively may be evacuated in order to provide good heat transfer characteristics between the heated refrigerant flowing in one direction in the passageway 43 to water flowing in the second passageway 45 in a direction opposite to the one direction.

The collapsible member 41 serves as expansion absorpting means for absorbing the expansion of water in the passageway 45 in the event that water begins to freeze or otherwise expand.

Figure 3:
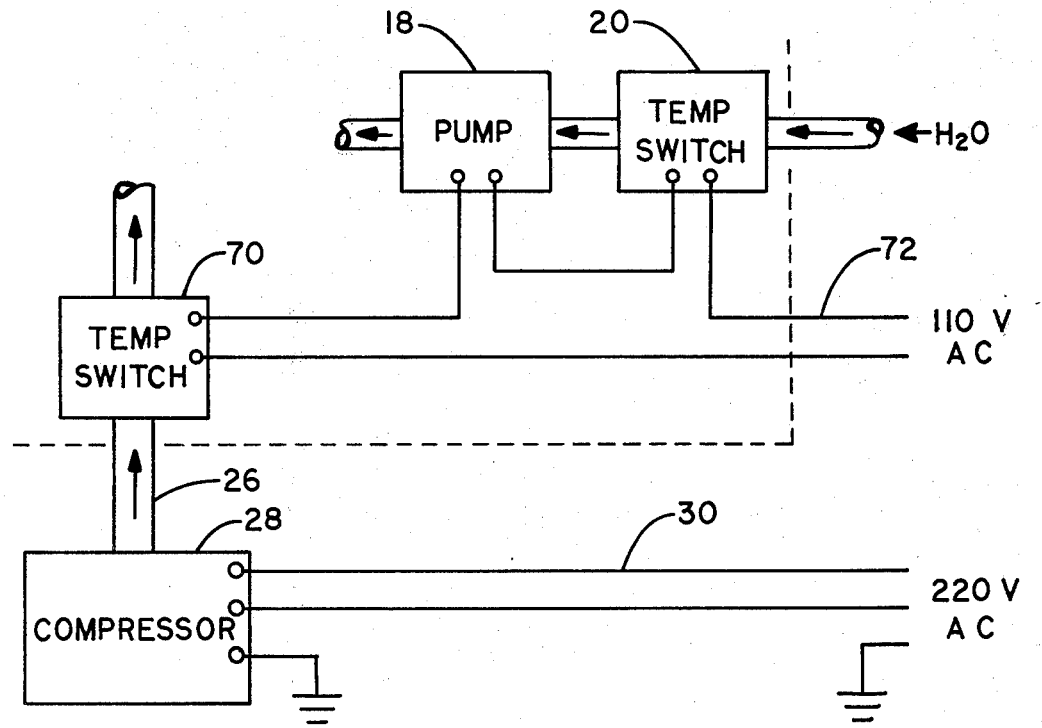
FIG. 3 illustrates an alternate embodiment of that of FIG. 1.

Another embodiment of a portion of the system of FIG. 1 will now be described with reference to FIG. 3, which includes the compressor 28, the line voltage input 30 thereto, the pump 18 and the switch 20 of FIG. 1. Additionally, a second temperature switch 70 is provided, interposed in the refrigerant line 26 from the compressor 28. This second temperature switch may likewise comprise a KLIXON switch, such as that described above. A second line voltage input 72 is provided, independent of the line voltage input 30 to the compressor 24. The second line voltage input 72 is coupled to the pump in series with both temperature switches 20, 70, in the manner shown in FIG. 3. As described above, the first switch 20 is adapted to render the pump 18 inoperative when the returning water temperature is greater than a preselected temperature. In accordance with the embodiment of FIG. 3, the second temperature switch 70 is selected to close (that is, complete the circuit of the line voltage input 72) when the temperature of the coolant flowing in the output 26 of the compressor 28 is at, or above a preselected temperature. In this way, the pump 18 is energized when the air conditioner compressor is running and the coolant temperature is at the desired level as determined by the second temperature switch 70, and while the first temperature switch 20 is closed, indicating that the returning water is at acceptable temperature levels. However, while the pump 18 is operated in conjunction with the compressor 28, energization of the pump is independent of the line voltage input 30 to the compressor. This allows pumps operating on a 110 volts alternating current to be employed, in those situations where the line voltage input 30 to the compressor 24 is at greater voltage levels, e.g. on the order of 220 volts.

Figure 4:
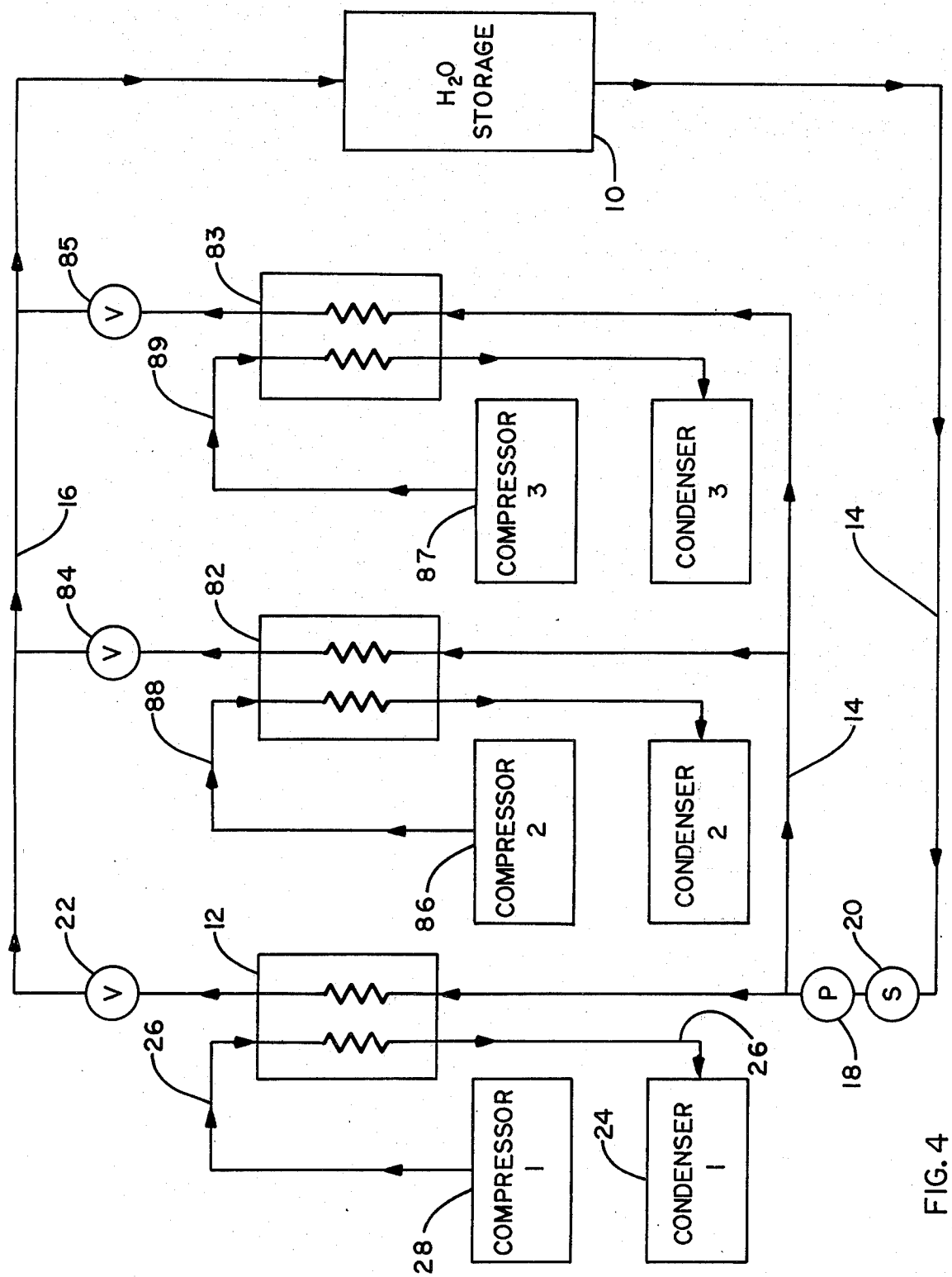
FIG. 4 illustrates another embodiment in accordance with the present invention.

A multiple heat exchange unit embodying the present invention is shown in FIG. 4. That portion of FIG. 4 on the left side of the dotted line identified as 1—1' constitutes the same energy transfer system shown in FIG. 1. In accordance with the embodiment of FIG. 4, there is provided additional heat exchangers 82, 83 coupled in parallel with the first heat exchanger 12 and connected with the pump 18 with repect to the water reservoir 10. Second and third thermally operated valves 84, 85 like the temperature valve 22 of FIG. 1, are coupled in series with the respective heat exchangers 82, 83. Second and third air conditioner compressors 86, 87 are provided, each having a respective input line 88, 89 extending through the corresponding heat exchanger 82, 83 in the same manner as the relationship between the input 26 and the heat exchanger 12 of FIG. 1. In operation, the pump 18 is energized when any of the air conditioner compressor 28, 86 and 87 is operating, to circulate the water. However, a flow path for the water back to the water reservoir will not be completed, until such time as one of the valves 22, 84 or 85 opens responsive to a sufficient temperature of the water at the output of the respective heat exchanger 12, 82 or 83.

Figure 5:
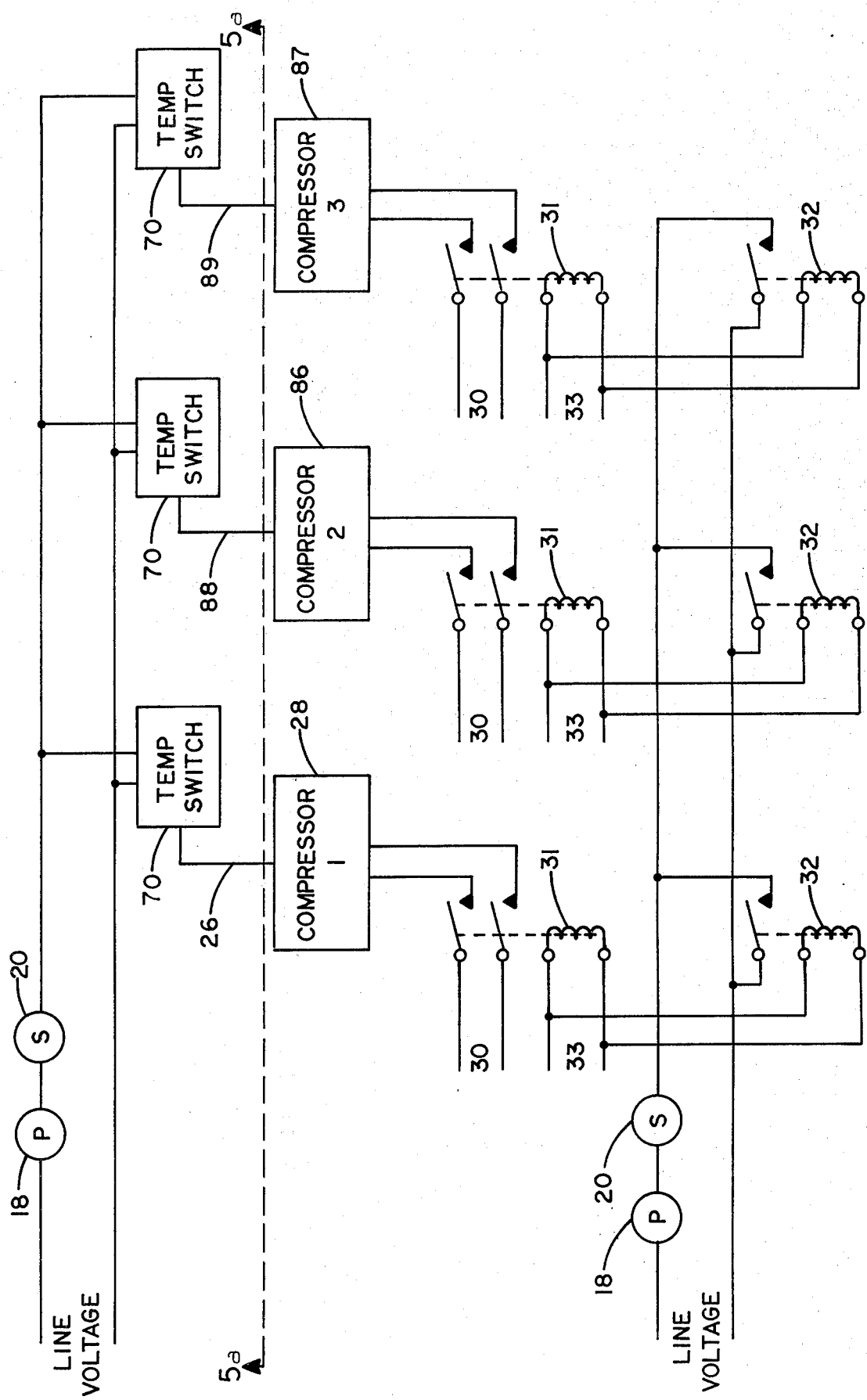
FIG. 5 is a schematic diagram illustrating an electrical system for the embodiment of FIG. 4.

Two arrangements for controlling the pump 18 as used with a multiplicity of heat exchangers are shown in FIG. 5. As noted above, it is necessary that the pump 18 be energized whenever one or more of the compressors 12, 82 or 83 are running, without disturbing the independent control of each compressor.

One means of control as shown in FIG. 5 utilizes the control voltage 33 which normally operates the contactor 31 (note FIG. 1) which, in the embodiment of FIG. 5, energizes the compressor 28 and operates a secondary relay 32. The same arrangement is followed on each and all compressors. The contacts of relay 32 are all wired in parallel and the pump 18 is energized upon the closing of any one of the relays 32, and will remain energized so long as any one compressor is energized.

A second means of control is shown in that portion of FIG. 5 identified as 5(a). In this instance, a second temperature switch 70 is located on each hot gas line 26, 88 and 89 for each of the compressors 12, 86 and 87. These switches are identical to the temperature sensing switch 70 of FIG. 3. Again the switch contacts are wired in parallel, and the pump 18 will be energized whenever one of the compressors 12, 86 or 87 is operating.

What is claimed is:

1. An energy transfer system for use with refrigeration means and a water reservoir, said refrigeration means of the type having a compressor and a compressible refrigerant flowing through an output from said compressor, said energy transfer system comprising:
    heat exchange means coupled in said output of said compressor and to said water reservoir for receiving water from said reservoir and transferring heat from said refrigerant thereto;
    a pump interposed between said reservoir and said heat exchange means for pumping water therebetween;
    temperature sensing means thermally coupled to water passing through said pump and electrically coupled to said pump for rendering said pump inoperative when the temperature of said water is at or above a preselected temperature;
    a return water line coupled between said heat exchange means and said water reservoir;
    a temperature sensing valve interposed in said return line between said heat exchange means and said water reservoir, and in close proximity to said heat exchange means for preventing water from exiting said heat exchange means until said water is at, or above a predetermined temperature; and wherein said heat exchange means effects a reduction in the temperature of said refrigerant from said compressor and an increase in the temperature of water passing back into said reservoir.

2. An energy transfer system as recited in claim 1 further comprising:
    an entry water line between said reservoir and said heat exchange means;
    said pump and said temperature sensing means interposed in said entry line; and wherein
    said pump, when operating, is adapted to pump water out of said reservoir, through said entry line, said heat exchange means, said temperature sensing valve, said return line and back into said reservoir.

3. An energy transfer system as recited in claim 2 wherein a first portion of said return line is positioned above a portion of said entry line, said valve being positioned in said first portion of said return line.

4. An energy transfer system as recited in claim 1 further comprising another compressor having an output and a refrigerant associated therewith, said energy transfer system further including:
    a second heat exchange means coupled between said pump and said water reservoir and in parallel with said one heat exchange means, said output of said another compressor coupled with said second heat exchange means; and
    another temperature sensing valve coupled in series with said second heat exchange means.

5. An energy exchange system as recited in claim 1 further comprising means for energizing said pump only during operation of said compressor.

6. An energy transfer system as recited in claim 5 wherein said energizing means comprises:
    a line voltage input for said compressor; and
    means electrically coupling said pump across said line voltage input.

7. An energy transfer system as recited in claim 6 wherein said coupling means is coupled to said pump through said temperature sensing means.

8. An energy transfer system as recited in claim 5 wherein said energizing means comprises:
    a second temperature sensing means interposed in said input to said compressor;
    a line voltage input coupled to said pump through said second temperature sensing means; and wherein
    said second temperature sensing means energizes said pump when the temperature of said refrigerant exceeds a predetermined temperature.

9. An energy transfer system as recited in claim 8 wherein said line voltage input is coupled to said pump through both of said temperature sensing means.

10. An energy transfer system as recited in claim 9 wherein said heat exchange means comprises:

a member having an enclosed outer wall;
a first inner wall enclosed within said outer wall and defining a first passageway therebetween;
said inner wall defining a second passageway therebetween;
means coupling the output of said pump to one of said first and second passageways; and
means coupling said compressor output to the other of said first and second passageways.

11. An energy transfer system as recited in claim 10 further comprising:

a third inner wall interposed between said first and second inner walls and defining a third passageway between said first and second passageways; and
means in said third passageway for providing good heat transfer characteristics between said first and second passageways.

12. An energy transfer system as recited in claim 10 further comprising expansion absorbing means positioned in said second passageway thereof.

* * * * *